United States Patent [19]

Abbott et al.

[11] Patent Number: 4,828,691
[45] Date of Patent: May 9, 1989

[54] SUBMERSIBLE PURIFICATION SYSTEM FOR RADIOACTIVE WATER

[75] Inventors: Michael L. Abbott, Fort Collins, Colo.; Donald R. Lewis, Pocatello, Id.

[73] Assignee: The United States of America as represented by the United States Department of Energy, Washington, D.C.

[21] Appl. No.: 126,154

[22] Filed: Nov. 30, 1987

[51] Int. Cl.⁴ .............................................. C02F 9/00
[52] U.S. Cl. ........................................ 210/87; 210/93; 210/96.1; 210/109; 210/167; 210/237; 210/266; 210/282; 210/662; 210/669; 210/682
[58] Field of Search ............... 210/662, 668, 669, 682, 210/93, 96.1, 109, 143, 167, 169, 266, 282, 284, 900, 87, 170, 237, 258, 261, 262, 97, 195.1

[56] References Cited

U.S. PATENT DOCUMENTS

| | | | |
|---|---|---|---|
| 2,752,309 | 6/1956 | Emmons et al. | 210/284 |
| 3,276,458 | 1/1963 | Iversen et al. | 210/900 |
| 3,870,033 | 3/1975 | Faylor et al. | 210/669 |
| 4,107,044 | 8/1978 | Levendusky | 210/266 |
| 4,280,912 | 7/1981 | Berry et al. | 210/900 |
| 4,430,226 | 2/1984 | Hegde et al. | 210/900 |
| 4,438,337 | 3/1984 | Forrat | 250/436 |
| 4,548,716 | 10/1985 | Boeve | 210/900 |
| 4,659,460 | 4/1987 | Muller et al. | 210/241 |

Primary Examiner—Ivars Cintins
Attorney, Agent, or Firm—William W. Randolph; Judson R. Hightower; Richard E. Constant

[57] ABSTRACT

A portable, submersible water purification system for use in a pool of water containing radioactive contamination includes a prefilter for filtering particulates from the water. A resin bed is then provided for removal of remaining dissolved, particulate, organic, and colloidal impurities from the prefiltered water. A sterilizer then sterilizes the water. The prefilter and resin bed are suitably contained and are submerged in the pool. The sterilizer is water tight and located at the surface of the pool. The water is circulated from the pool through the prefilter, resin bed, and sterilizer by suitable pump or the like. In the preferred embodiment, the resin bed is contained within a tank which stands on the bottom of the pool and to which a base mounting the prefilter and pump is attached. An inlet for the pump is provided adjacent the bottom of the pool, while the sterilizer and outlet for the system is located adjacent the top of the pool.

13 Claims, 1 Drawing Sheet

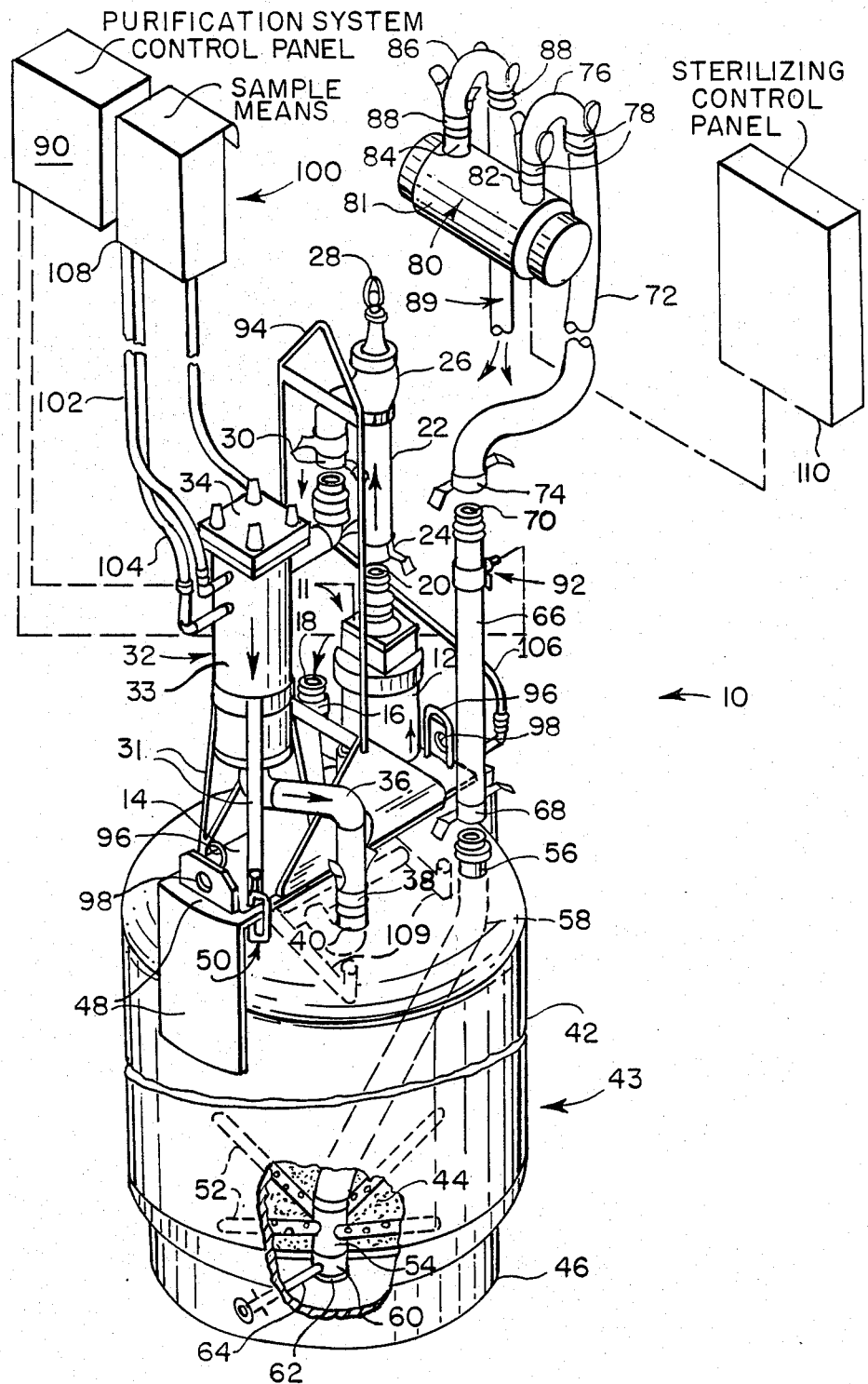

SUBMERSIBLE PURIFICATION SYSTEM FOR RADIOACTIVE WATER

The U.S. Government may have rights in this invention pursuant to contract DE-AC11-76PN00014 between the U.S. Department of Energy and Westinghouse Electric Corporation.

FIELD OF THE INVENTION

The present invention relates generally to the purification of water in a nuclear power plant fuel pool, and more particularly to a portable and submersible fuel pool water purification system which allows simple waste disposal of collected radioactive contaminants.

BACKGROUND OF THE INVENTION

Nuclear power plants and other nuclear facilities typically store fuel rods or other radioactive materials in large pools of water. These water pools provide both cooling and shielding for the radioactive materials. Typically, such pools use a centralized water purification system which is permanently mounted in a dry equipment or auxiliary room. Because such systems concentrate radioactive contaminants which are present in the pool water, high radiation areas develop which significantly increase personnel exposure during required periodic operation and maintenance.

An alternative to these types of systems which was used in the past consisted of submersible concrete vaults which contained six 6.3 cubic foot resin tanks connected in parallel with the flow provided by a 2.5 horsepower submersible pump. Such a system produced a minimal flow rate (50 to 60 GPM), required excessive floor space (22.3 square feet), and produced excessive radioactive waste due to the integral concrete shield vault (waste packaged volume to expended resin volume ratio of 4.1:1). Such systems were also difficult to dispose of due to the high levels of radioactive contamination built up on the rough concrete surfaces.

A method and apparatus for purifying fluids containing radioactive impurities is disclosed in U.S. Pat. No. 4,107,044 (Levendusky). This apparatus includes a vessel having appropriate radiation shielding thereabout. Inside the vessel is a means for the filtration of undissolved solids and ion exchange removal of dissolved solids. The radioactive shielding is designed to be sufficient to preclude the emission of radiation from within the vessel upon the complete expenditure of the filter apparatus and demineralizing material. The apparatus is designed to be portable in order to be brought to a plant, utilized, and then carted away for disposal.

Other water purification systems have also been disclosed in the prior art. For example, in U.S. Pat. No. 3,276,458, (Iverson et al) an ultra pure water recirculating system including a filter, an ultra violet lamp sterilizer and an ion exchange resin in the circulating system is disclosed. A similar system which produces hydrogen-free water by the addition of ozone is also disclosed in U.S. Pat. No. 4,548,716 (Boeve).

A process for decontaminating water, and in particular for removing fission products and other radioisotopes from radioactively contaminated water, is disclosed in U.S. Pat. No. 2,752,309 (Emmons et al). In this process, the water is fed through a first column including a layer of glass wool, a layer of steel wool, a layer of burned clay, and a layer of moist activated carbon. Then, the water is fed through a second column containing an anion exchange resin and a cation exchange resin. An apparatus which utilizes ultraviolet radiation in the purification of water is also disclosed in U.S. Pat. No. 4,438,337 (Forrat).

SUMMARY OF THE INVENTION

In accordance with the present invention, a portable, submersible water purification system for use in a pool of water containing radioactive contamination is provided. The system includes a prefilter means contained in a submersible watertight container for filtering particulates from the water. An ion-exchange means contained in a submersible watertight tank is also provided for removal of remaining dissolved, particulate, organic, and colloidal impurities from the prefiltered water of the prefilter means. A sterilizing means is also provided for sterilizing the water. The sterilizing means is provided in a watertight housing which is located out of the pool. A circulating means is provided for circulating the water in the pool through the prefilter means, ion-exchange means, and sterilizing means.

In a preferred embodiment, the circulating means includes a pump and a base is provided to which the pump, prefilter means, and ion-exchange means are all commonly mounted. The tank containing the ion-exchange means preferably includes a top and a bottom. The base is mounted to the top of the tank so that the base is located above the tank and the bottom of the tank forms a stand for the tank and for the prefilter means, pump, and base. Preferably, the base is detachably mounted to the tank and a connecting means is provided for detachably connecting fluidly the prefilter means and the ion-exchange means. The base is also preferably provided with handles for lifting the base and the tank also preferably includes handles for lifting the tank so that the base and tank could be lifted as a unit or separately. In order to drain the tank, a drain valve is provided at the bottom.

In the preferred embodiment, the pump includes an inlet through which water in the pool is drawn and an outlet fluidly connected to the inlet of the prefilter means. The outlet of the prefilter means is then fluidly connected to the inlet of the ion-exchange means. The outlet of the ion-exchange means is fluidly connected to the inlet of the sterilizing means, and the outlet of the sterilizing means returns the water to the pool. The circulating means preferably includes a length of piping between the outlet of the ion-exchange means and a top of the pool where the inlet to the sterilizing means is located. Thus, the base is located adjacent to the bottom of the pool and the sterilizing means is located adjacent the surface of the pool.

The circulating means advantageously includes a throttle valve means for controlling the flow of water through the pump, and hence through the system. A flow sensing means is also provided adjacent the outlet of the tank for sensing the flow of water therethrough.

In the preferred embodiment, the prefilter means filters particles greater than about 60 microns and the ion-exchange means includes ion-exchange resins and activated carbon in the tank. The sterilizing means includes an ultraviolet radiation source.

The purification system of the present invention preferably also includes a sample means for taking samples of the water entering the prefilter means and samples of the water exiting both the prefilter means and the filter means. Two control means are also provided for monitoring system pressure and flowrate and for controlling the operation of the sterilizing means. The control means are located at an appropriate position out of the pool.

It is an advantage of the present invention that the system operates on the floor of the fuel pool and is shielded by the pool water. This location eliminates centralized system flow piping and resultant development of radioactive hot spots and personnel exposure.

It is also an advantage of the present invention that the system is totally self-contained and transportable. This allows complete remote operation of the system which is provided at any desired location of the fuel pool. In addition, the transportability of the present invention allows treatment of isolated fuel pool zones as desired, or treatment of areas that require enhanced water purification in the pool.

It is a further advantage of the present invention that the system requires a minimum of floor space due to a vertical, stacked design while still achieving a significant flow rate.

Still another advantage of the present invention is that the tank containing the ion-exchange means is usable as a disposal container, eliminating the need for transfer of the depleted resin discharge from the tank. A drain at the bottom of the tank allows water in the tank to be drained therefrom, allowing resin shipment. The remainder of the system is then used with a new ion-exchange means.

Yet another advantage of the present invention is the minimum radioactive waste package volume per cubic foot of depleted resin due to the elimination of resin vessel shielding and the detachment and reuse of support components. It is contemplated that temporary, reusable transport shielding may be used for disposal shipment of the tank as needed.

Another advantage of the present invention is that the system is totally operated and maintained by remote manual control at the surface. Maintenance—including prefilter replacement, pump replacement, flow control, and sampling—are all performed by personnel at the surface on the submerged system so that the personnel are shielded by the water at all times.

Other features and advantages of the invention are stated in or apparent from a detailed description of a presently preferred embodiment of the invention found hereinbelow.

BRIEF DESCRIPTION OF THE DRAWING

The single FIGURE is a schematic perspective view of the present invention with a portion broken away of the ion-exchange means.

DETAILED DESCRIPTION OF THE PREFERRED EMBODIMENT

With reference now to the drawing in which like numerals represent like elements, a portable, submersible water purification system 10 is schematically depicted. Purification system 10 is particularly adapted for purifying the water contained in a nuclear fuel pool or the like in which the water contains radioactive contaminants. A circulation means 11 is used to circulate water from the pool through purification system 10. Circulation means 11 includes a pump 12 such as a ten horsepower Prosser Pump which is held to a base 14. Water is drawn into pump 12 through a suction adaptor 16 having an inlet 18 as shown. Pump 12 includes an outlet 20 to which a piping 22 is connected by means of a quick disconnect coupling 24. Disposed in piping 22 is a pump throttle valve means 26. Pump throttle valve means 26 is adjusted by a stem 28 which is adapted to be remotely actuated from the surface by a suitable connecting tool or the like.

Piping 22 is connected by a quick disconnect coupling 30 to a prefilter means 32. Prefilter means 32 is designed to remove particulates greater than about 60 microns. Preferably, prefilter means 32 is a Ronningen-Petter prefilter available commercially. Attaching prefilter means 32 to base 14 is a suitable mounting means 31. Prefilter means 32 includes a filter bag (not shown) which is provided inside of a submersible container 33. The design of container 33 with a removable end 34 allows changing of the filter bag by technicians at the surface of the pool. The outlet of prefilter means 32 is connected by a piping 36 having a quick disconnect coupling 38 to an inlet 40 of an internal distribution system 109 inside ion-exchange means 43. This distribution system 109 provides a uniform imput of water inside the ion-exchange means 43 including a resin tank 42. Resin tank 42 is preferably a submersible stainless steel ten gauge tank holding approximately 80 cubic feet of ion exchange resins and activated carbon 44. As shown, resin tank 42 includes a bottom which forms a stand 46 for resin tank 42. At the top of resin tank 42, a standard lifting brace 48 is included to which base 14 is suitably attached by clamps 50. It should be appreciated that the clamps attaching base 14 to lifting brace 48 are suitably located so that clamps 50 may be removed or inserted from the surface by technicians without interference of the remainder of the structure of purification system 10.

As shown by the broken away portion of resin tank 42, collection arms 52 are disposed at the bottom of resin tank 42 to collect water passing through ion exchange resins and activated carbon 44 and to direct this water to a central collection chamber 54. Collection chamber 54 is fluidly connected to an outlet 56 of resin tank 42 by a pipe 58. Below collection chamber 54, a drain valve 60 and drain outlet 62 are provided. Drain valve 60 is remotely actuatable by an extended stem 64 which extends through the side of stand 46 and thus can be actuated by the technicians at the surface of the pool. It should be appreciated that drain valve 60 is closed during operation of the system.

Connected to outlet 56 of resin tank 42 is a piping 66. Piping 66 includes a quick disconnect coupling 68 for attachment to outlet 56. Piping 56 includes an outlet 70 to which a flexible piping 72 is attached by use of a quick disconnect coupling 74. Flexible piping 72 is of sufficient length to reach to the top of the pool in which purification system 10 is located.

Flexible piping 72 is connected by a U-shaped pipe 76 having quick disconnect couplings 78 at each end to an inlet 82 of a sterilizing means 80. Sterilizing means 80 includes a water tight housing 81 in which is contained an ultraviolet light sterilizer such as manufactured by Ultraviolet Purification System, Inc. which contains 12 germicidal lamps. Thus, sterilizing means 80 kills all microorganisms in the water passing through housing 81. Sterilizing means 80 also includes an outlet 84, to which a U-shaped pipe 86 is connected having quick disconnect couplings 88. An outlet tube 89 is attached at the other end to U-shaped pipe 86 to discharge water passing through purification system 10 back into the top of the pool of water. As an alternative to discharging the water into the pool, the outlet tube 89 can be replaced by a connection to equipment that requires a source of purified water. It should be appreciated that sterilizing means 80 is maintained at the surface of the pool by a suitable means such as a support or float from which U-shaped pipes 76 and 86 hang.

In order to control pump means 12, a control panel 90 is provided at a suitable location out of the pool. Control panel 90 is suitably connected to pump means 12 as shown schematically. Preferably, a flow sensing means 92 is provided in piping 66 to sense the flow of water through piping 66. Flow sensing means 92 is preferably monitored at control panel 90 by use of a suitable connection thereto.

As mentioned above, base 14 is removably attached to lifting brace 48 of resin tank 42. In order to lift base 14 from lifting brace 48, a central handle 94 extends above base 14. In addition, side handles 96 are provided at each end of base 14 to assist in the remote positioning of base 14.

Purification system 10 also preferably includes a sampling means 100. Sampling means 100 is used to sample the water prior to passing through prefilter means 32, and after passing through prefilter means 32 and ion-exchange means 43. Thus, sampling means 100 includes a line 102 for sampling the water entering prefilter means 32, a line 104 for sampling the water about to leave prefilter means 32 and enter ion-exchange means 43, and a line 106 for sampling the water leaving ion-exchange means 43 in piping 66. Line 102 and line 104 each include a pressure gauge (not shown) at sampling means 100 to monitor the pressure drop across the prefilter. The pressure gauges are used to determine when the filter bag (not shown) must be replaced. As shown, lines 102, 104, and 106 are connected to a sample panel 108 which is conveniently located above the surface of the pool and which is accessible to the technicians at a suitable location.

The sterilizing means 80 is controlled by a control panel 110 as schematically shown. The control panel 110 is conveniently located remote from the pool for easy access.

In operation, purification system 10 functions in the following manner. Upon actuation of pump 12 and sterilizing means 80 by control panels 90 and 110, water in the pool is drawn into inlet 18 of suction adaptor 16 by the operation of pump 12. This water is then pumped through throttle valve means 26 to prefilter means 32. In prefilter means 32, particulates greater than about 60 microns are removed from the water in order to extend the life of the ion exchange resins and activated carbon 44 contained in ion-exchange means 43. After prefiltering, the water passes through piping 36 into internal distribution system 40. Distribution arms 109 direct the water into ion-exchange means 43 containing ion exchange resins and activated carbon 44. After passing through ion exchange resins and activated carbon 44, the water enters collection arms 52 and passes back up through resin tank 42 through pipe 58. The water then passes through piping 66 and flexible piping 72 to sterilizing means 80 where the water is sterilized before being passed back into the pool of water at the top of the pool through outlet tube 89.

During operation, it should be appreciated that the flow through piping 66 is sensed by flow sensing means 92. If the flow is not as desired, pump throttle valve means 26 is suitably adjusted by rotation of stem 28. In addition, if it is desired to test the operation of purification system 10, sampling means 100 is used to sample the water at various positions in purification system 10. The samples can be compared to determined the effectiveness of purification system 10 in removing radioactive contaminants from the water. The pressure gauges in sampling means 100 are used to determine when filter bag must be replaced.

It should be appreciated that purification system 10 is portable within the pool to any desired location by suitably attaching lifting means to eyelets 98. In addition, the stacked design of purification system 10 allows the placement of purification system 10 wherever there is sufficient floor space for stand 46.

It should also be appreciated that purification system 10 is specifically designed to contain an inlet 18 adjacent the bottom of the pool, or rather which is spaced from the bottom of the pool only by the height of resin tank 42. Thus, both prefilter means 32 and filter means 43 which collect radioactive contaminants are located as far away as possible from the top of the pool to provide the maximum shielding for personnel. This location of inlet 18 adjacent the bottom of the pool is further designed to be distant from the position of outlet tube 89 located adjacent the top of the pool. By locating outlet tube 89 adjacent the top of the pool, uncontaminated (and hence safer) water is discharged adjacent the top of the pool where personnel are likely to be located. On the other hand, contaminated water which has contaminants which tend to drift to the bottom of the pool is maintained at the bottom of the pool, near where inlet 18 is located.

It should further be appreciated that it is possible to adjust throttle valve means 26 while pump 12 is submerged by using an appropriate tool which attaches to stem 28 and which is manipulated by personnel at the surface of the pool. Similarly, the filter bag in prefilter means 32 can also be changed by removal of end 34 by personnel at the top of the pool while prefilter means 32 is submerged and the personnel are shielded.

When the resins in ion-exchange means 43 become expended, it should further be appreciated that resin tank 42 then serves as a transport vessel for ion exchange resins and activated carbon 44. This is accomplished by disconnecting base 14 from lifting brace 48 by suitably unlatching quick disconnect couplings 68 and 38, and removal of clamps 50 while resin tank 42 rests on the floor of the pool. Base 14 and the associated elements attached thereto can be removed from resin tank 42 by lifting of central handle 94. Side handles 96 are used to remotely position base 14. Outlet 56 is sealed by a suitable cap and a cap with a one way breather valve is placed on inlet 40. The breather valve is required to assist in subsequent draining. Next, resin tank 42 is lifted above the pool and drain valve 60 is opened remotely by use of extended stem 64. This allows the water remaining in resin tank 42 to drain therefrom to allow shipping of resin tank 42. A shielded transport vessel may be used during operation of drain valve 60 and subsequent transfer to a disposal facility to provide personnel shielding.

After draining, drain valve 60 is closed. As resin tank 42 will be radioactive to some extent, auxiliary shielding will probably be necessary for resin tank 42. However, once transported to the dump site, resin tank 42 is simply suitably buried or the like and the shielding is reusable. As soon as resin tank 42 is removed, a new resin tank 42 is lowered into the pool and base 14 attached thereto together with quick disconnect couplings 38 and 68. Thus, purification system 10 is again ready for operation in a very short time.

With purification system 10, a minimum radioactive waste package volume per cubic foot of depleted resin (1.3:1 ratio) is achieved due to the elimination of the resin tank shielding and the detachment and reuse of sterilizing means 80 and the components attached to base 14. It is contemplated that a purification system 10 according to the present invention will utilize a minimum of floor space (twelve square feet), which is very small for a system having a purification flow rate of approximately 150 gallons per minute. In addition, the small size and self-contained nature of the present invention allows treatment of isolated fuel pool zones or areas, as desired, which may require enhanced water purification.

Although a presently preferred embodiment of the present invention has been described above, it will be understood by those of ordinary skill in the art that variations and modifications can be effected within the scope and spirit of the invention.

I claim:

1. A portable, submersible water purification system for use in a pool of water containing radioactive contamination comprising:
   a prefilter means for filtering particulates and radioactive contaminants from the water, said prefilter means including a submersible watertight container and having an inlet for receiving the water in the pool and an outlet for the prefiltered water;
   an ion-exchange means for removing remaining radioactive contaminents and dissolved particulate, organic, and colloidal impurities from the prefiltered water, said ion-exchange means including a submersible watertight tank and having an outlet for the purified water and an inlet connected to the outlet of said prefilter means for receiving the prefiltered water;
   a sterilizing means for sterilizing the purified water from the ion-exchange means, said sterilizing means including a watertight housing and having an inlet for receiving the water from the ion-exchange means and an outlet for sterilized water; and
   a circulating means for circulating the water in the pool through said prefilter means, said ion-exchange means, and said sterilizing means whereby the water in the pool is purified.

2. A water purification system as claimed in claim 1 wherein said circulating means includes a pump; and further including a mounting base to which said pump, said prefilter means, and said ion-exchange means are mounted.

3. A water purification system as claimed in claim 2 wherein said tank of said ion-exchange means includes a top and a bottom, said top of said tank being mounted to said base such that said base is located above said tank and said bottom of said tank forms a stand for said tank and for said prefilter means, said ion-exchange means, said pump, and said base.

4. A water purification system as claimed in claim 3 and further including an attaching means for detachably mounting said base to said tank, and a connecting means for detachably connecting fluidly said prefilter means and said ion-exchange means; wherein said base includes handles for lifting said base; and wherein said tank includes handles for lifting said tank such that when said base and said tank are attached together they are lifted as a unit and when said base and said tank are separated they are lifted separately by their respective handles.

5. A water purification system as claimed in claim 4 wherein said tank further includes a drain valve at said bottom.

6. A water purification system as claimed in claim 2 wherein said pump includes an inlet through which water in the pool is drawn and an outlet fluidly connected to said inlet of said prefilter means, wherein said outlet of said prefilter means is fluidly connected to said inlet of said ion-exchange means, wherein said outlet of said ion-exchange means is fluidly connected to said inlet of said sterilizing means, and wherein said outlet of said sterilizing means returns the water to the pool.

7. A water purification system as claimed in claim 6 wherein said circulating means includes a length of piping between said outlet of said ion-exchange means and a top of the pool where said inlet of sterilizing means is located such that as said base is adjacent a bottom of the pool said sterilizing means is adjacent a surface of the pool.

8. A water purification system as claimed in claim 6 wherein said circulating means includes a throttle valve means for controlling the flow of water through said pump.

9. A water purification system as claimed in claim 8 and further including a flow sensing means adjacent said outlet of said tank for sensing the flow of water through said outlet of said tank.

10. A water purification system as claimed in claim 2 and further including a control means located out of the pool for controlling the operation of said pump and for controlling the operation of said sterilizing means.

11. A water purification system as claimed in claim 1 wherein said prefilter means filters out particles having a size greater than about 60 microns, wherein said ion-exchange means includes ion exchange resins and activated carbon in said tank, and wherein said sterilizing means includes an ultraviolet radiation source.

12. A water purification system as claimed in claim 1 and further including a sample means for taking samples of the water entering said prefilter means and the water exiting from said ion-exchange means.

13. A portable, submersible water purification system for use in a pool of water containing radioactive contamination comprising:
   a prefilter means for filtering particulates from the water, said prefilter means including a submersible watertight container and having an inlet for receiving the pool water and an outlet for the prefiltered water;
   an ion-exchange means connected to said prefilter means for removing remaining dissolved, particulate, organic, and colloidal impurities from the prefiltered water, said ion-exchange means including a watertight tank which is submersible in the pool and having an outlet for the purified water and an inlet for receiving the prefiltered water;
   a sterilizing means connected to said ion-exchange means for sterilizing the water, said sterilizing means including a watertight housing and having an inlet for receiving the water from the ion-exchange means and an outlet for the sterilized water;
   a pump means connected to said prefilter means for circulating the pool water through said prefilter means, said ion-exchange means, and said sterilizing means; and
   a base means removably mounted on said watertight tank and connected to said pump means and said prefilter means for supporting said pump means and said prefilter means above said watertight tank and for lifting said pump means and said prefilter means from said watertight tank when they are separated therefrom.

* * * * *